United States Patent
Puglia (10) Patent No.: US 12,036,512 B2
(45) Date of Patent: Jul. 16, 2024

(54) SPACER FILM WITH INTEGRATED LAMINATION STRIP

(71) Applicant: ENTEGRIS, Inc., Billerica, MA (US)

(72) Inventor: John Paul Puglia, Townsend, MA (US)

(73) Assignee: ENTEGRIS, INC., Billerica, MA (US)

( * ) Notice: Subject to any disclaimer, the term of this patent is extended or adjusted under 35 U.S.C. 154(b) by 668 days.

(21) Appl. No.: 16/318,195

(22) PCT Filed: Jul. 17, 2017

(86) PCT No.: PCT/US2017/042327
§ 371 (c)(1),
(2) Date: Jan. 16, 2019

(87) PCT Pub. No.: WO2018/017455
PCT Pub. Date: Jan. 25, 2018

(65) Prior Publication Data
US 2019/0282964 A1 Sep. 19, 2019

Related U.S. Application Data (60) Provisional application No. 62/363,637, filed on Jul. 18, 2016.

(51) Int. Cl.
*B01D 63/14* (2006.01)
*B01D 63/10* (2006.01)
*B01D 71/36* (2006.01)

(52) U.S. Cl.
CPC ........... *B01D 63/14* (2013.01); *B01D 63/101* (2022.08); *B01D 71/36* (2013.01);
(Continued)

(58) Field of Classification Search
CPC .. B01D 2313/146; B01D 63/14; B01D 71/36; B01D 2201/0461; B01D 2201/127; B01D 2253/104; B01D 2253/106; B01D 2253/108; B01D 2253/1085; B01D 2253/304; B01D 2253/308; B01D 2256/14; B01D 2257/60; B01D 2313/143;
(Continued)

(56) References Cited

U.S. PATENT DOCUMENTS 3,757,955 A * 9/1973 Leonard ................. B01D 71/32
210/321.77
3,962,096 A * 6/1976 Ishii ....................... B01D 63/10
210/321.83

(Continued)

FOREIGN PATENT DOCUMENTS

CN 102470323 A 5/2012
DE 3931451 A1 * 9/1991 ............. B32B 27/08
(Continued)

OTHER PUBLICATIONS

Roseman, Thinking Outside The Tube, Mar. 2, 2006, p. 1 (Year: 2006).*

*Primary Examiner* — Dirk R Bass (57) ABSTRACT

Spacers for filtration membranes that are formed from perforated films. The spacer include unperforated regions, which can serve as integrated lamination strips, advantageously omitting the need for separate lamination steps required with woven and nonwoven spacer fabrics while also providing a spacer with a uniform thickness.

12 Claims, 7 Drawing Sheets

(52) U.S. Cl.
CPC .. *B01D 2201/127* (2013.01); *B01D 2313/143* (2013.01); *B01D 2313/146* (2013.01)

(58) Field of Classification Search
CPC .. B01D 2313/44; B01D 25/26; B01D 29/012; B01D 29/031; B01D 29/111; B01D 29/21; B01D 35/00; B01D 46/0002; B01D 46/0036; B01D 46/12; B01D 46/521; B01D 46/543; B01D 53/02; B01D 53/0407; B01D 61/147; B01D 63/061; B01D 63/067; B01D 63/081; B01D 63/082; B01D 63/10; B01D 65/00; B01D 71/32; B01D 69/10; B01D 39/16; B01D 39/1623; B01D 69/12; B01D 63/103; B01D 63/00; B01D 2053/221; B01D 2201/0407; B01D 53/228; B01D 69/02; B01D 2256/10; B01D 2256/16; B01D 2257/504; B01D 2265/04; B01D 2313/40; B01D 2315/10; B01D 2319/06; B01D 2323/21; B01D 2323/283; B01D 2323/286; B01D 2323/30; B01D 2323/46; B01D 2325/08; B01D 2325/12; B01D 2325/20; B01D 2325/24; B01D 39/1692; B01D 46/2411; B01D 53/22; B01D 63/08; B01D 63/106; B01D 65/003; B01D 67/0009; B01D 67/0079; B01D 67/0088; B01D 69/08; B01D 69/142; B01D 71/26; B01D 71/38; B01D 71/40; B01D 71/56; B01D 71/64; B01D 71/68; B01D 71/76; B01J 20/103; B01J 20/18; B01J 20/28004; B01J 20/28019; B01J 2220/66; C01B 13/10; C02F 1/444; C02F 3/1273; Y02W 10/10
See application file for complete search history.

(56) References Cited

U.S. PATENT DOCUMENTS

| | | | |
|---|---|---|---|
| 4,479,874 | A | 10/1984 | Rosenberg et al. |
| 4,826,599 | A * | 5/1989 | Bikson .................. B01D 69/12 210/500.36 |
| 4,834,881 | A * | 5/1989 | Sawada .................. B01D 63/10 210/321.74 |
| 6,511,600 | B1 | 1/2003 | Ohtani |
| 2010/0320139 | A1 | 12/2010 | Diemer et al. |
| 2015/0298040 | A1 | 10/2015 | Nozaki |
| 2015/0306539 | A1* | 10/2015 | Yamato ............... H01M 50/403 210/490 |
| 2016/0136572 | A1* | 5/2016 | Narita .................. B01D 69/142 96/13 |
| 2016/0339391 | A1* | 11/2016 | Hansen .................. C02F 1/444 |

FOREIGN PATENT DOCUMENTS

| | | |
|---|---|---|
| EP | 0418773 A2 | 3/1991 |
| EP | 2905066 A1 | 8/2015 |
| GB | 1351433 A | 5/1974 |
| JP | 2001224929 A | 8/2001 |
| JP | 2015515376 A | 5/2015 |
| WO | 2003105994 A1 | 12/2003 |
| WO | 2004112945 A1 | 12/2004 |
| WO | 2006091157 A1 | 8/2006 |
| WO | 2010036374 A1 | 4/2010 |

* cited by examiner

SPACER FILM WITH INTEGRATED LAMINATION STRIP

CROSS-REFERENCE TO RELATED APPLICATIONS

This application is filed under the provisions of 35 U.S.C. § 371 claiming priority of International Patent Application No. PCT/US2017/042327 filed on Jul. 17, 2017, which further claims the benefit under 35 USC 119 of U.S. Provisional Patent Application No. 62/363,637, filed Jul. 18, 2016, the disclosures of which are hereby incorporated herein by reference in their entirety for all purposes.

BACKGROUND OF THE INVENTION

Filters, as used in various gas, liquid, chemical, and water filtration applications, often include spacers next to filtration membranes to improve flow and process throughput of the filter.

SUMMARY OF THE INVENTION

This invention pertains to a spacer film for a filter, as well and methods of making and using a spacer film that allows for improved tracking and improved flow in a filter.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

While this invention will be particularly shown and described with references to example embodiments thereof, it will be understood by those skilled in the art that various changes in form and details may be made therein without departing from the scope of the invention encompassed by the appended claims.

While various compositions and methods are described, it is to be understood that this invention is not limited to the particular compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "filter element" is a reference to one or more filter elements and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

A description of example embodiments of the invention follows.

Filters often include spacers next to, between, and/or around filtration membranes. Spacers are typically formed from woven or nonwoven fabrics, such as netting or extruded fibers that form an open-meshed material to allow for flow through the filter and/or to increase turbulence of the flow while imparting no measurable contribution toward pressure drop across the filter. Spacers may alternatively be referred to as screens and can serve a variety of functions within a filter. For example, a feed spacer can be included in a filter to prevent a filtration membrane from sticking to itself and to prevent channeling of the filter feed, both of which lessen the productivity of the filter. Spacers can additionally provide support and protection to filtration membranes. For example, spacers can prevent damage to the membrane by cushioning the membrane and preventing it from abrading against itself or other elements located in a filter housing. Additionally, spacers can structurally support pleated or unpleated membrane composite structures within filtration devices.

Versions of the present invention include spacers formed from perforated films, as opposed to woven- and nonwoven-fiber screens. Spacer films of the present invention include unperforated regions, which can serve as integrated lamination strips, advantageously omitting the need for separate lamination steps required with woven and nonwoven spacer fabrics while also providing a spacer with a uniform thickness. Additionally, films are less likely to compress in the x-y plane than woven and non-woven spacer fabrics. As such, spacer films of the present invention, when laminated to edges of a membrane, advantageously prevent membrane shrinkage during device construction and/or application processing.

Figure 1:
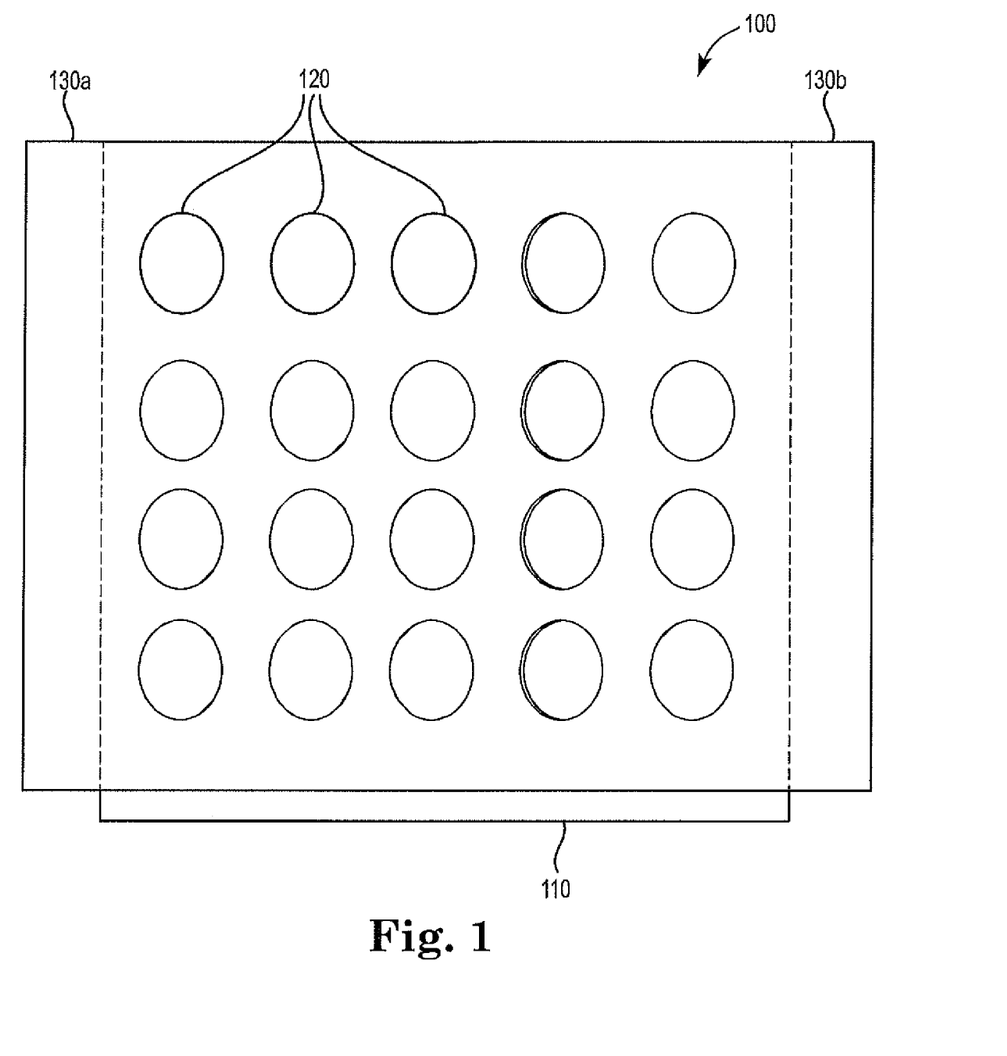
FIG. 1 is a schematic illustrating a spacer film in accordance with a version of the invention.

FIG. 1 illustrates a sheet of spacer film in accordance with a version of the invention. The spacer film 100 has a central portion 110 that includes a plurality of perforations 120 and two unperforated regions 130a, 130b located at opposing edges 132, 134 of the film 100. The unperforated regions 130 may also be referred to as integrated lamination strips. Perforations 120 are illustrated to be substantially oval in shape; however, other configurations are possible. Spacer film perforations can have other shapes, such as circular, triangular, or irregular shapes, and varying shapes can be included in the same sheet of spacer film.

As shown in FIG. 1, perforations 120 are substantially aligned in rows and columns; however, other geometric orientations or patterns are possible. Perforation patterns can have generic configurations for use in multiple applications, or perforation patterns can be made specific for use in a particular application. For example, perforations can be offset and/or the perforations could be orientated on a diagonal. Additionally, perforations can occur at varying spacing intervals. Perforations can be spaced at about 10 μm×10 μm or greater (e.g., about 10 μm, about 20 μm, about 30 μm, about 40, μm, about 50 μm, about 100 μm in either dimension). Alternatively, perforations can have a random spacing. The orientation of the perforations (e.g., linear or off-set), the perforation shape and size, and the perforation spacing can be selected based on the desired application.

Versions of the present invention include perforated films as spacer material, as opposed to woven-fiber and nonwoven-fiber fabrics. Typically, the thickness of woven-fiber and nonwoven-fiber spacer fabrics is from about 30 μm to about 180 μm, and typically at least about 55 to about 65 μm. Spacer films of the present invention can be cast to have a thickness that is about the same as, or less than, the typical thickness of woven-fiber and nonwoven-fiber spacer fabrics. For example, spacer films of the present invention can be cast to have a thickness of about 20 μm to about 180 μm, or of about 30 μm to about 55 μm, for example, about 29.5 μm, about 35 μm, about 40 μm, about 45 μm, about 50 μm, and about 55.5 μm. The films can be cast and perforated with geometric patterns, such as perforations 120 (FIG. 1), which permit flow through the spacer film. As filter housings are typically provided in standard sizes, it can be desirable to include a thinner spacer in the filter. A thinner spacer allows for a greater length of filtration membrane to be included in a given filter housing than would be possible with a thicker spacer material. The additional membrane included in the filter provides additional surface area for filtration, thereby increasing productivity of the filter. Films of the present invention have a superior buckling resistance than non-woven and woven spacers, which provides a more precise flow channel to mitigate frictional loses associated with woven and non-woven surfaces.

Figure 2A:
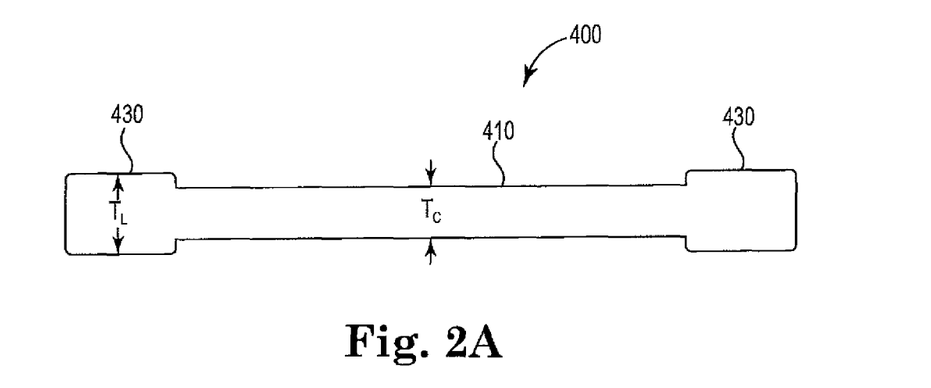
FIG. 2A is a schematic illustrating a cross-section of a spacer film prior to lamination in accordance with a version of the invention.

A cross-section of a spacer film 400 is illustrated in FIG. 2A. The film 400 has a perforated center region 410 and unperforated edges 430, which can have different thicknesses prior to lamination. The thickness $T_C$ of center region 410 can be less than the thickness $T_L$ of the unperforated edges 430. The difference between thicknesses $T_C$ and $T_L$ can result from the unperforated regions 430 along the edges of the film tending to bulk-up or crimp-up relative to the perforated region 410.

The unperforated regions 430 can serve as integrated lamination strips to seal edges of the spacer film 400 to a filtration membrane. Thus, the unperforated regions 430 can eliminate the need for a separate manufacturing step to perform edge lamination of the spacer to a membrane. Contamination can occur at each step in the manufacturing process of a filter, where additional materials are introduced to the filter or components of the filter are manipulated. Aseptic devices are increasingly more difficult to produce as the number of ingredients increase. Accordingly, it can be desirable to eliminate manufacturing steps and/or the introduction of additional materials during the manufacturing process. Typically, spacers are made to adhere to filtration membranes through a lamination or sealing process. The lamination process typically involves the application of a discrete lamination strip or the coating of a sealant to the edges of the membrane and/or spacer. The process can then involve the application of heat to complete lamination and/or require a period of time for curing before the spacer and membrane can be pleated or wound into a filter element. The introduction of such additional materials and manufacturing steps introduces potential sources of contamination, both chemical and biological. Spacer films of the present invention, which have unperforated regions to serve as integrated lamination strips, advantageously omit the need to apply separate laminate or sealant, thereby eliminating a potential source of contamination in the filter assembly process. Additionally, lamination of spacer films of the present invention can be performed following assembly into, for example, a pleat pack, thereby eliminating the need for a discrete lamination step prior to assembly.

After lamination of the spacer film to a filtration membrane, a uniform thickness across the spacer film can be obtained. For example, a spacer film 400 cast to have a 40 μm thickness may have a center region thickness $T_C$ of 40 μm and an unperforated region thickness $T_L$ of 80 μm. Upon lamination of the unperforated edges 430 to a filtration membrane, the spacer film 400 can have a uniform thickness across the width of the spacer film of about 40 μm.

Figure 2B:
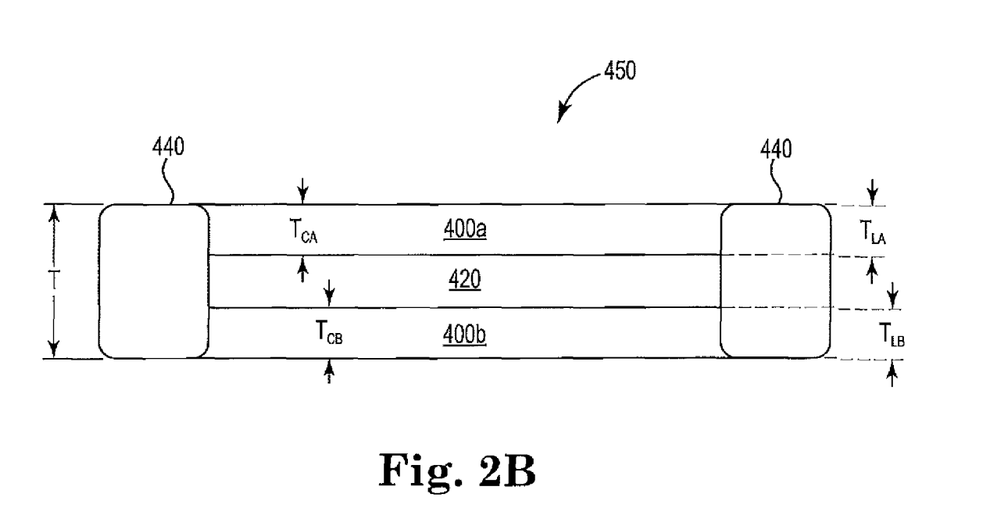
FIG. 2B is a schematic illustrating a cross-section of a laminated spacer film and membrane stack in accordance with another version of the invention.

As further illustrated in FIG. 2B, two spacer films 400a, 400b, each adjacent to and laminated to a membrane 420, have a uniform thickness. The unperforated regions of spacer films 400a, 400b, following lamination, form laminated regions 440 on opposing edges of the stack 450 of spacer films 400a, 400b and membrane 420. The unperforated region thicknesses $T_{LA}$, $T_{LB}$ can be the same or approximately the same as the center region thicknesses $T_{CA}$, $T_{CB}$ of the films 400a, 400b, such that a uniform thickness T is achieved over the width of the stack 450.

A uniform thickness across the spacer film assists with the pleating of a membrane-spacer stack to form a pleated filter element, or the winding of a membrane-spacer stack to form a spiral-wound filter element. Uneven spacer films typically do not track well through filter assemblies during both construction and operation and, further, uneven spacing can compromise the structure and appearance of the completed filter.

Spacer films of the present invention can be formed from, for example, perfluoroalkoxy polymer (PFA), high density polyethylene (HDPE), polyvinylidene fluoride (PVDR), polypropylene, polyethylene terephthalate (PET), polysulfone, polytetrafluoroethylene (PTFE), ultra-high-molecular-weight polyethylene (UHMWPE), polyethylene (PE), polyamide (e.g., nylon), polycarbonate, and polyimide. The material from which spacer films of the present invention are made can be compatible with the material from which a membrane is made. Membranes can be made of, for example, PTFE, polypropylene, PE, ultra-high molecular weight polyethylene (UPE), polyvinylidene fluoride (PVDF), polysulfone, polycarbonate, polyimide, and polyamide. In some versions, spacer films of the present invention are formed from the same material as that of the filtration membrane, thereby avoiding the potential for cross-contamination between the spacer film and the membrane. In other versions, spacer films and membranes can be made from different materials, depending upon the application. For example, filters to be used for a chemical sensitive, but not temperature sensitive, process can include a membrane made of PTFE and a spacer made of polypropylene.

Figure 5:
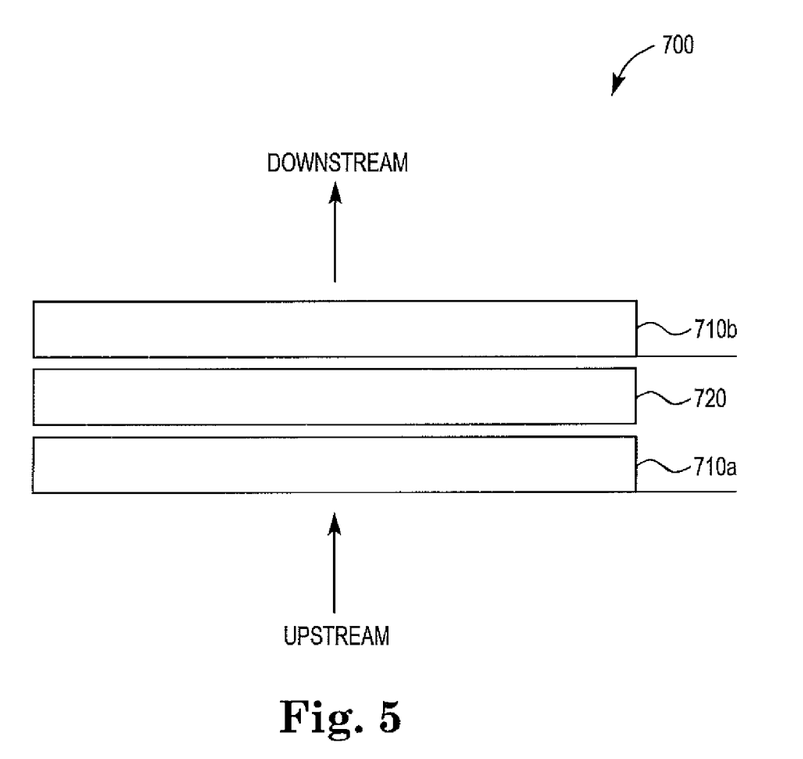
FIG. 5 is a diagram illustrating layering of spacer films of the present invention with a filtration membrane.
Figure 6:
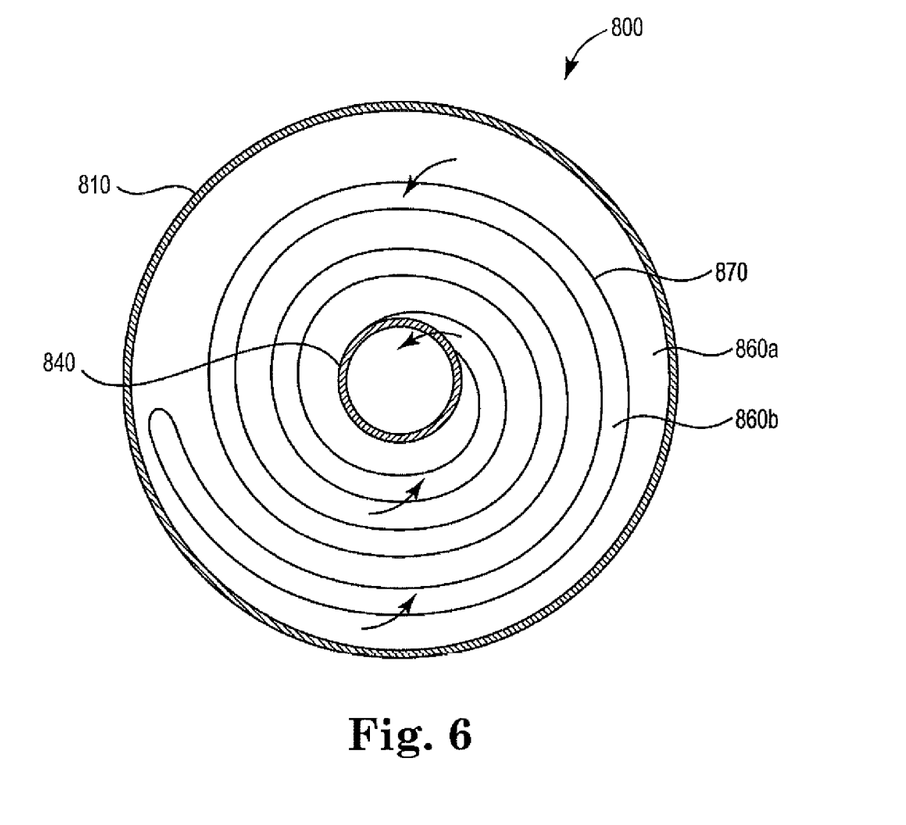
FIG. 6 is a diagram illustrating a cross section of a filter including a spiral-wound filtration member and spacer films of the present invention.

Spacer films of the present invention can be placed on either side of a filtration membrane, forming a stack, as illustrated in FIG. 5. Flow of the feed to be filtered through a membrane 720 is indicated in FIG. 5 by arrows. The stack 700 includes a spacer film 710a on an upstream side of membrane 720 (e.g., serving as a feed screen) and a spacer film 710b on a downstream side of membrane 720 (e.g., serving as a permeate screen). The spacer-membrane stack 700 can then be laminated and pleated to form a pleat pack for a pleated filter element (FIG. 3), or laminated and wound to form a spiral-wound filter element (FIG. 6). Although stack 700 includes two spacer films (710a, 710b), more or fewer layers of spacer films can be included in a filter. For example, a filter may include only one layer of a spacer film on either an upstream side or downstream side of a filtration membrane, such as where only a feed screen or only a permeate screen is desired. Alternatively, for example, a filter may include three layers of spacer films, such as one layer of spacer film on the upstream side of the membrane and two layers of spacer film on the downstream side of the membrane, such as where a thicker permeate channel than feed channel is desired, or vice-versa.

Figure 3:
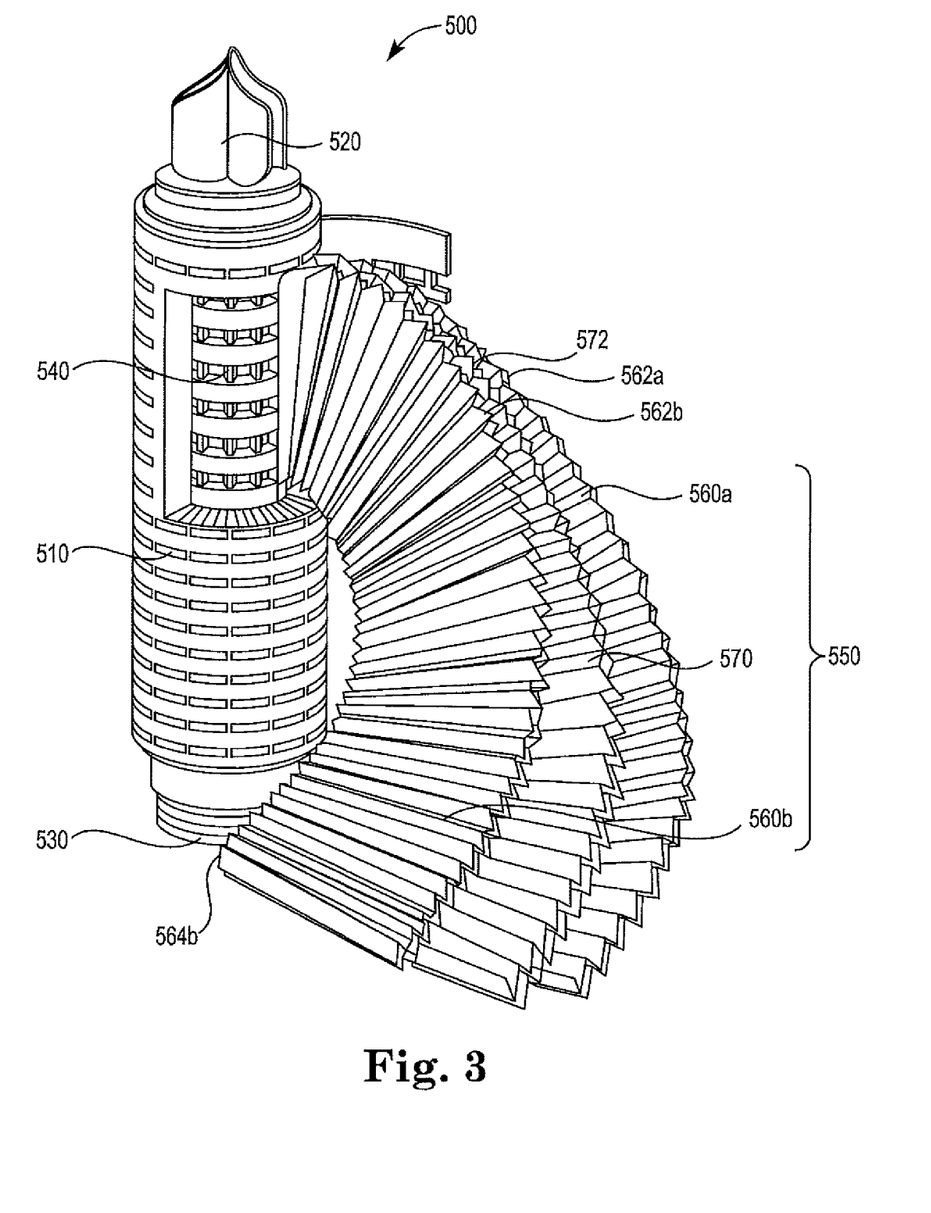
FIG. 3 is a perspective view of a filter including spacer films in accordance with one version of the invention.

A filter containing a pleated spacer-membrane stack is illustrated FIG. 3. The filter 500 includes a housing 510 with an endcap 520 at a first end and a fluid fitting 530 at a second end. Within the housing is a core 540, about which a pleat-pack 550 is located. Pleat-pack 550 includes an upstream spacer film 560a, a filtration membrane 570, and a downstream spacer film 560b. Pleat-pack 550 is shown in an exploded view for illustration purposes. Spacer films 560a, 560b are typically laminated to membrane 570 along the edge of the pleat-pack closest to end cap 520 (e.g., edges 562a, 562b and 572) and the edge closest to fitting 530 (e.g., edge 564b, and the corresponding edges of spacer 560a and membrane 570 not visible in FIG. 3). The lamination of spacer films 560a, 560b to membrane 570 ensure that a feed entering filter 500 does not arrive downstream of membrane 570.

Figure 4:
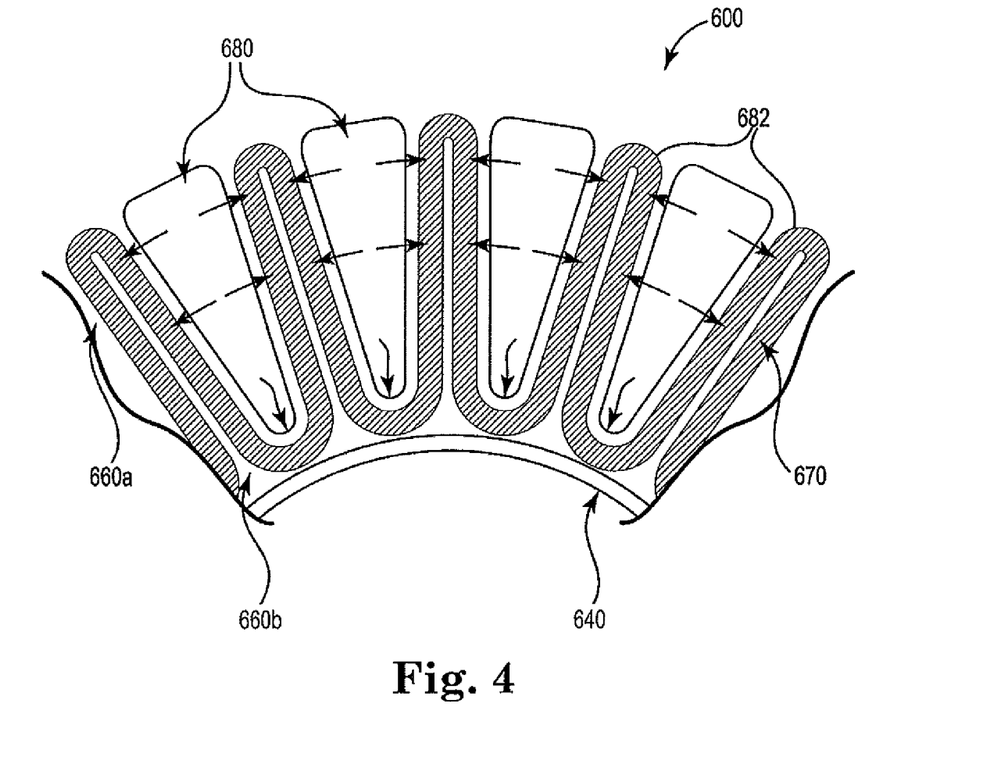
FIG. 4 is a diagram illustrating a cross section of a filter including a pleated filtration membrane and spacer films of the present invention.

A cross-sectional view of a portion of a filter that includes a pleated filtration membrane and spacer films is shown in FIG. 4, with flow paths of a feed through the filter 600 indicated by arrows. Feed enters any of volumes 680 between pleats 682 and travels through an upstream spacer film 660a. The feed is then filtered through membrane 670 and travels through downstream spacer film 660b to core 640. Spacer films 660a, 660b are located on either side of membrane 670 and assist with maintaining open channels between pleats 682 through which a feed may travel.

A cross-sectional view of a filter containing a spiral-wound spacer-membrane stack is illustrated in FIG. 6. The filter 800 includes a housing 810 with a core 840. An upstream spacer film 860a occupies a space around membrane envelope 670, which contains a downstream spacer film 860b. Flowpaths of a feed through the filter 800 are indicated by arrows in FIG. 6. Feed filtering through membrane 870 travels through downstream spacer film 860b, arriving at core 840.

A method of making a filter, such as filters 700, 600, 800 includes stacking at least one spacer film adjacent to a filtration membrane and laminating the edges to form a laminated spacer-membrane stack. The method further includes pleating, stacking, or spiraling the spacer-membrane stack about itself or a core, forming a filter element. The filter element can then be placed in a housing and a heat source can be applied to both ends of the housing, causing the lamination strips of the spacer film to bond to the ends of the housing. Alternatively, the prior lamination of the spacer film(s) to the filtration can be omitted, with the lamination of the spacer film(s) to the membrane occurring after the pleated or spiral-wound filter element is placed in the housing and the heat source is applied to the housing. Ultrasonic techniques can also be employed to provide energy directors to impart polymer flow, causing sealing to occur. Woven and nonwoven fabrics used as spacers typically do not include enough material to accomplish lamination to the membrane and/or bonding to the filter housing without additional lamination material and a separate lamination step. Spacer films of the present invention advantageously do not require a separate lamination strip and/or a separate lamination step.

Figure 7:
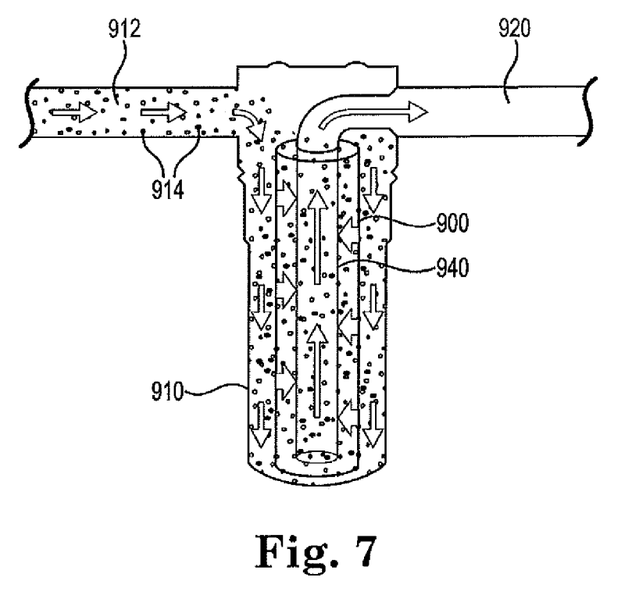
FIG. 7 is a diagram illustrating a filtration process.

FIG. 7 illustrates a flow path through a filter 900, which can contain a pleated spacer-membrane stack (FIG. 3) or a spiral-wound spacer-membrane stack (FIG. 6). Flow paths of the feed through the filter are indicated by arrows in FIG. 7. A liquid feed 912 containing contaminants 914 travels into filter housing 910. The feed is filtered as it travels through the spacer-membrane stack (not shown in FIG. 7) before arriving at core 940, from which the filtered feed 920 exits the housing 910.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain versions thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A filter element, comprising:
at least one spacer for a filter wherein the at least one spacer is a film having an unlaminated thickness of from 20 μm to about 180 μm and having perforations substantially located in a central region and at least two unperforated regions located on opposing edges of the film, the unperforated regions being laminable to a filtration membrane; and
A filtration membrane adjacent to the at least one spacer, wherein the filtration membrane and the at least one spacer is pleated and rolled about a core.

2. The filter element of claim 1, wherein the film comprises perfluoroalkoxy polymer, polyethylene, polyvinylidene fluoride, polypropylene, polyethylene terephthalate, polysulfone, polytetrafluoroethylene, polyamide, polycarbonate, or polyimide.

3. The filter element of claim 1, wherein the film comprises perfluoroalkoxy polymer.

4. The filter element of claim 1, wherein the filtration membrane comprises perfluoroalkoxy polymer, polyethylene, polyvinylidene fluoride, polypropylene, polyethylene terephthalate, polysulfone, polytetrafluoroethylene, polyamide, polycarbonate, or polyimide.

5. A filter, comprising:
a housing;
a filtration membrane; and
at least one spacer adjacent to the filtration membrane, wherein the at least one spacer is a film having an unlaminated thickness of from 20 μm to about 180 μm and having perforations substantially located in a central region and at least two unperforated regions located on opposing edges of the film, wherein the unperforated regions are laminated to the filtration membrane, and the filtration membrane and at least one spacer is pleated or rolled about a core within the housing.

6. The filter of claim 5, wherein the unperforated regions of the film are bonded to the housing.

7. The filter of claim 5, wherein the at least one spacer laminated to the filtration membrane prevents shrinkage of the filtration membrane during operation.

8. The filter of claim 5, wherein the film comprises perfluoroalkoxy polymer, polyethylene, polyvinylidene fluoride, polypropylene, polyethylene terephthalate, polysulfone, polytetrafluoroethylene, polyamide, polycarbonate, or polyimide.

9. The filter of claim 5, wherein the film comprises perfluoroalkoxy polymer.

10. The filter of claim 5, wherein the filtration membrane comprises perfluoroalkoxy polymer, polyethylene, polyvinylidene fluoride, polypropylene, polyethylene terephthalate, polysulfone, polytetrafluoroethylene, polyamide, polycarbonate, or polyimide.

11. The filter of claim 5, wherein the film has an unlaminated thickness of from about 30 μm to about 55 μm.

12. The filter of claim 5, wherein the central region of the film has a thickness and the unperforated edges of the film have a thickness, and wherein, prior to lamination, the thickness of the central region is less than the thickness of the unperforated edges.

* * * * *